United States Patent
Nakaniwa (10) Patent No.: US 10,690,478 B2
(45) Date of Patent: Jun. 23, 2020

(54) SURVEY METHOD AND SURVEY APPARATUS

(71) Applicant: KUMONOS Corporation, Minoo-shi, Osaka (JP)

(72) Inventor: Kazuhide Nakaniwa, Minoo (JP)

(73) Assignee: Kumonos Corporation, Minoo-shi, Osaka (JP)

( * ) Notice: Subject to any disclaimer, the term of this patent is extended or adjusted under 35 U.S.C. 154(b) by 280 days.

(21) Appl. No.: 15/802,001

(22) Filed: Nov. 2, 2017

(65) Prior Publication Data

US 2018/0128595 A1   May 10, 2018

(30) Foreign Application Priority Data

Nov. 7, 2016 (JP) ................. 2016-217484

(51) Int. Cl.
| | |
|---|---|
| G01C 3/08 | (2006.01) |
| G01B 11/00 | (2006.01) |
| G01C 15/00 | (2006.01) |
| G01B 11/03 | (2006.01) |
| G01B 11/30 | (2006.01) |
| G01S 7/481 | (2006.01) |
| G01S 17/42 | (2006.01) |

(52) U.S. Cl.
CPC ............ G01B 11/002 (2013.01); G01B 11/03 (2013.01); G01B 11/306 (2013.01); G01C 15/002 (2013.01); G01S 7/481 (2013.01); G01S 17/42 (2013.01)

(58) Field of Classification Search
CPC ..... G01B 11/002; G01B 11/306; G01B 11/03; G01S 7/481; G01S 17/42; G01C 15/002
USPC ....................................................... 356/4.01
See application file for complete search history.

(56) References Cited

U.S. PATENT DOCUMENTS

| | | | |
|---|---|---|---|
| 6,473,166 B1 | 10/2002 | Ohishi et al. | |
| 8,977,076 B2 * | 3/2015 | Samadani ............. | G06T 3/0012 345/670 |
| 2011/0128388 A1* | 6/2011 | Pai ......................... | G01B 11/03 348/187 |

FOREIGN PATENT DOCUMENTS

| | | |
|---|---|---|
| JP | 2000-221037 A | 8/2000 |
| JP | 2004-333211 A | 11/2004 |
| JP | 2010-085311 A | 4/2010 |
| JP | 2016-173296 A | 9/2016 |
| WO | WO 2013/035612 A1 | 3/2013 |

* cited by examiner

*Primary Examiner* — Mark Hellner
(74) *Attorney, Agent, or Firm* — Buchanan Ingersoll & Rooney PC (57) ABSTRACT

A survey method comprises a first step for obtaining coordinates of first to fourth points on a wall surface; a second step for specifying first to fourth surfaces; a third step for obtaining distances $\delta 4$, $\delta 1$, $\delta 2$, $\delta 3$; a fourth step for determining a largest value $\delta max$ among the first to fourth distances $\delta 1$ to $\delta 4$ as an evaluation value; and a fifth step of defining any of the first to fourth surfaces as a specific surface specifying the wall surface if the evaluation value $\delta max$ is less than a predetermined threshold value $\delta th$.

7 Claims, 8 Drawing Sheets

Calculated and measured values (mm)

| surface | δa | δb | δc | δd | Av. | Max. | Measured | Difference |
|---|---|---|---|---|---|---|---|---|
| 1234 | -0.593 1(234) | -0.593 2(134) | -0.593 3(124) | -0.593 4(123) | 0.559 | 45.7 | 45.7 | 0 |
| 1235 | 2.950 1(235) | -25.410 2(135) | 1.536 3(125) | -3.041 5(123) | 8.234 | 896.2 | 45.7 | 850.5 |
| 1245 | 4.426 1(245) | 1.951 2(145) | 1.901 4(125) | -4.201 5(124) | 3.012 | 45.6 | 45.7 | -0.1 |
| 1345 | -3.104 1(345) | 1.574 3(145) | -25.368 3(145) | 3.063 5(134) | 8.277 | 896.2 | 45.7 | 850.5 |
| 2345 | -3.3.4 2(345) | 3.802 3(245) | -3.136 4(235) | 3.645 5(234) | 3.472 | 45.6 | 45.7 | -0.1 |

Definition Example surface 1234: surface defined by points $P_1, P_2, P_3, P_4$
-0.593 1(234): Numeral on the left side (-0.593) indicates a vertical distance from point $P_1$ to triangle plane $P_2 P_3 P_4$
Ave.: $(\delta a + \delta b + \delta c + \delta d)/4$
Max.: Width of the member calculated by using the maximum value $\delta$
Measured: Measurement value obtained by using caliper
Difference: Maximum value minus measurement value

FIG. 8

SURVEY METHOD AND SURVEY APPARATUS

TECHNICAL FIELD

The invention relates to a survey method and a survey apparatus and, more particularly, to a method and an apparatus for accurately specifying a wall surface or a surface portion of a building or a structure.

BACKGROUND

A non-prism total station is currently used for various surveys. By using the total station, an observation point located even at a high place can easily and precisely be measured without disposing a temporary scaffold.

The non-prism total station utilizes a reflected light of a laser beam emitted therefrom toward the observation point. However, for example, no reflected light is available from the corner or corner portion of the building, so that accurate coordinates of the corner cannot be obtained. Therefore, conventionally, a substitute observation point is provided on a wall surface in the vicinity of the corner, and the coordinates of the observation point are specified as the coordinates of the corner. However, the coordinates of the substitute observation point are not the actual coordinates specifying the coordinates of the corner.

In the meantime, there are instances where it is required to specify a flat surface by using a non-prism total station. For example, showing a distribution of cracks generated in a wall surface of the building by means of three-dimensional coordinate data needs data specifying the wall. Unfortunately, the actual wall surface is not completely flat and may include unevenness due to aging degradation. Therefore, for example, the specified surface, i.e., an equation of surface, specified by the coordinate data of three observed points on the wall surface may not reproduce the actual wall surface.

Patent Document 1: JP 2004-333211 A
Patent Document 2: JP 2010-85311 A

SUMMARY OF THE INVENTION

The invention is to provide a method and an apparatus for evaluating whether surface data observed by using, for example, a non-prism total station accurately reflects an actual wall surface, and a method for accurately measuring coordinates of corners (corner portions) and edges (edge portions) when these corners and edges are included in a surface.

A survey method (surface survey) according to an embodiment of the invention comprises a first step in which coordinates of first to fourth points on one wall surface are obtained;

a second step in which, following the first step, a first surface including the first, second, and third points, a second surface including the second, third, and fourth points, a third surface including the third, fourth, and first points, and a fourth surface including the fourth, first, and second points, are specified;

a third step in which, following the second step, a fourth distance $\delta 4$ between the first surface and the fourth point, a first distance $\delta 1$ between the second surface and the first point, a second distance $\delta 2$ between the third surface and the second point, and a third distance $\delta 3$ between the fourth surface and the third point are obtained;

a fourth step in which, following the third step, a largest value $\delta max$ of the first, second, third, and fourth distances $\delta 1$ to $\delta 4$ is determined as an evaluation value; and a fifth step in which, following the fourth step, any of the first to fourth surfaces is defined as a specific surface specifying the wall surface in response to a determination the evaluation value $\delta max$ being less than a predetermined threshold value $\delta th$.

The survey method according to another embodiment of the invention comprises a sixth step in which, following the fourth step, the first step is performed in response to a determination the evaluation value $\delta max$ being not less than the predetermined threshold value $\delta th$.

In the survey method described above, preferably, the coordinates of the first to fourth points are obtained by using a non-prism total station.

The survey method according to another embodiment of the invention comprises, a step (a) in which a direction angle and an elevation angle of the corner with respect to the non-prism total station are obtained, and a step (b) in which the coordinates of the corner from the direction angle, the elevation angle, and the specific surface is obtained;

wherein the steps (a) and (b) are performed if the wall surface has at least one corner.

The survey method according to another embodiment of the invention comprises, a step (c) in which a direction angle and an elevation angle with respect to the non-prism total station for each of at least two first and second edge points included in the edge are obtained, and a step (d) in which the coordinates of the first and second edge points from the direction angles and the elevation angles of the first and second edge points and the specific surface are obtained;

wherein the steps (c) and (d) are performed if the wall surface has at least one edge.

Another survey method (corner survey) according to an embodiment of the invention comprises a first step in which coordinates of three points on a wall surface having at least one corner by using a non-prism total station are obtained;

a second step in which, following the first step, a first surface including the three points is specified;

a third step in which, a direction angle and an elevation angle of the corner with respect to the non-prism total station are obtained; and a fourth step in which the coordinates of the corner from the direction angle, the elevation angle, and the specific surface are obtained.

Another survey method (edge survey) according to an embodiment of the invention comprises a first step in which coordinates of three points on a wall surface having an edge including at least two edge points by using a non-prism total station are obtained;

a second step in which, following the first step, a first surface including the three points is specified;

a third step in which a direction angle and an elevation angle of each of the two edge points with respect to the non-prism total station are obtained;

a fourth step in which coordinates of each of the two edge points from the direction angle, the elevation angle, and the specific surface are obtained; and a fifth step in which the edge from the coordinates of the two edge points are specified.

A survey method according to another embodiment of the invention comprises a first step in which coordinates of first to fourth points on one wall surface are obtained;

a second step in which, following the first step, one surface including the first point, the second point, and the third point is specified;

a third step in which a distance δ between the surface specified at the second step and the fourth point is obtained;

a fourth step in which whether the distance δ is not less than a predetermined threshold value δth is determined;

a fifth step in which the first step is performed in response to a determination the distance δ being not less than the predetermined threshold value δth and the surface specified at the second step is defined as a surface representative of the wall surface in response to a determination the distance δ being less than the predetermined threshold value δth.

In this survey method, preferably, the coordinates of the first to fourth points are obtained by using a non-prism total station.

A survey apparatus of the invention comprises a first means specifying one surface including a first point, a second point, and a third point on one wall surface;

a second means obtaining a distance δ between the surface specified by the first means and a fourth point on the one wall surface; and a third means defining the surface specified by the first means as a surface representative of the wall surface if the distance δ is less than a predetermined threshold value δth.

In the survey method and the survey apparatus described above, the "wall surface" refers to a flat surface and is a concept including not only a surface constituting a wall of a building or a structure but also a surface portion of a member constituting a workpiece of a steel tower etc. The edge point is a concept including a corner that is an end of an edge.

According to the survey method and the survey apparatus of the invention, even if a wall surface to be surveyed has distortion or unevenness, the wall surface can accurately be specified. According to the survey method and the survey apparatus of the invention, when a wall surface has corners or edges, these corners and edges can accurately be specified.

EMBODIMENTS OF THE INVENTION

A survey method and a survey apparatus according to the invention will now be described with reference to the accompanying drawings.

1. General Structure

Figure 1:
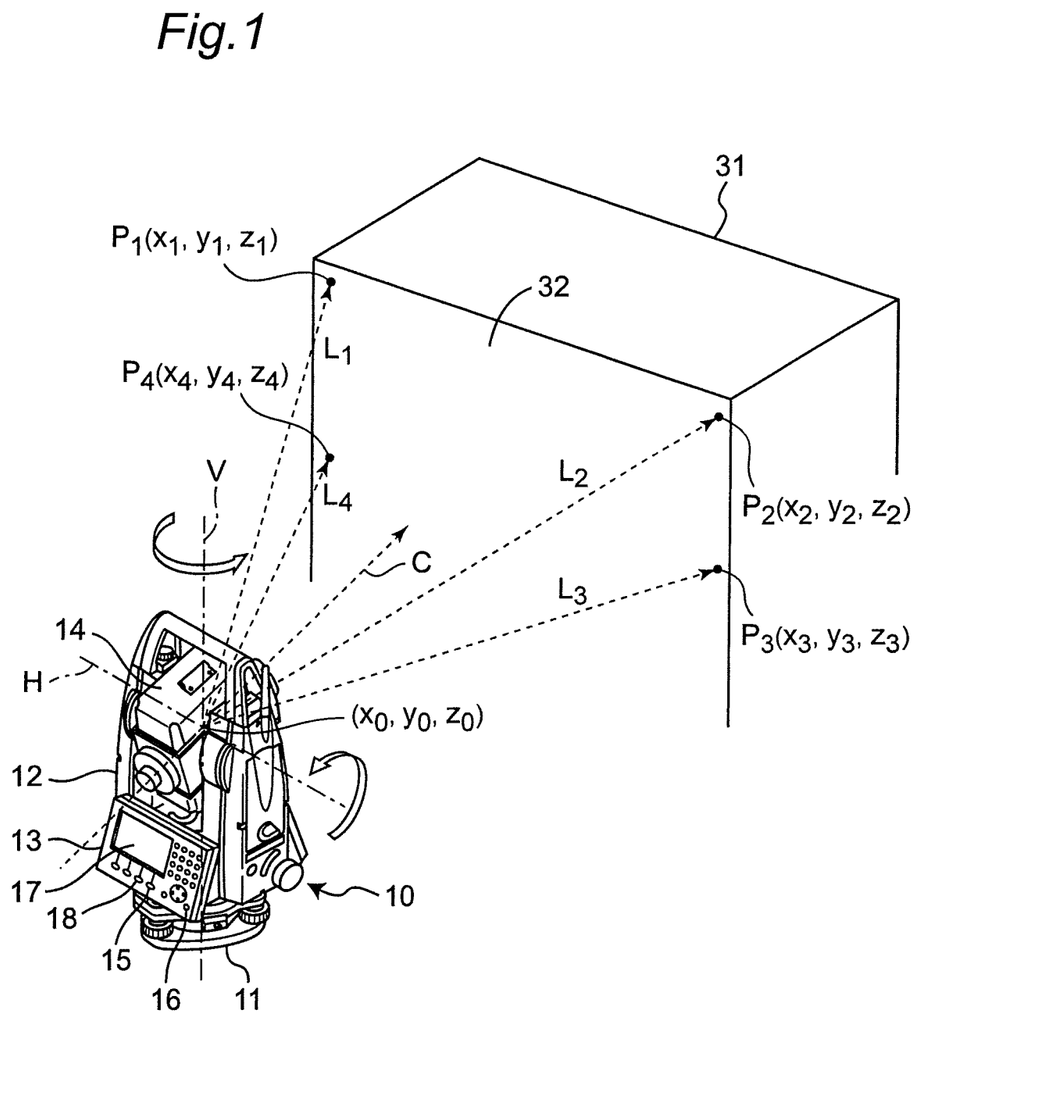
FIG. 1 is a schematic diagram showing a survey method (surface survey method) according to the invention.

FIG. 1 shows a non-prism total station 10 for use in a survey method according to the invention. Similar to the conventional total stations, the total station 10 has a distance measuring function using laser, an angle measuring function for specifying a direction of the collimation axis (angle of direction and angle of elevation) of a telescope, a coordinate measuring function for obtaining three-dimensional coordinate data of an observation point (collimation point of a telescope) from the measured distance and angles, and a special function of performing various calculations using three-dimensional coordinates of the observation point.

For those functions, the total station 10 has a lower structure (leveling plate) 11 capable of being fixed to a tripod and an upper structure 12 mounted on the lower structure 11. The upper structure 12 is rotatable around a vertical axis V relative to the lower structure 11. The upper structure 12 includes, for example, an input/output section 13 including an integrated input and output device which will be described later and a telescope 14. The telescope 14 is rotatable relative to the upper structure 12 around a horizontal axis H which is orthogonal to a vertical axis V. A collimation axis C of the telescope 14 extends orthogonal to the horizontal axis H through an intersection of the vertical axis V and the horizontal axis H. Hereinafter, the intersection will be referred to as a "reference point".

Figure 2:
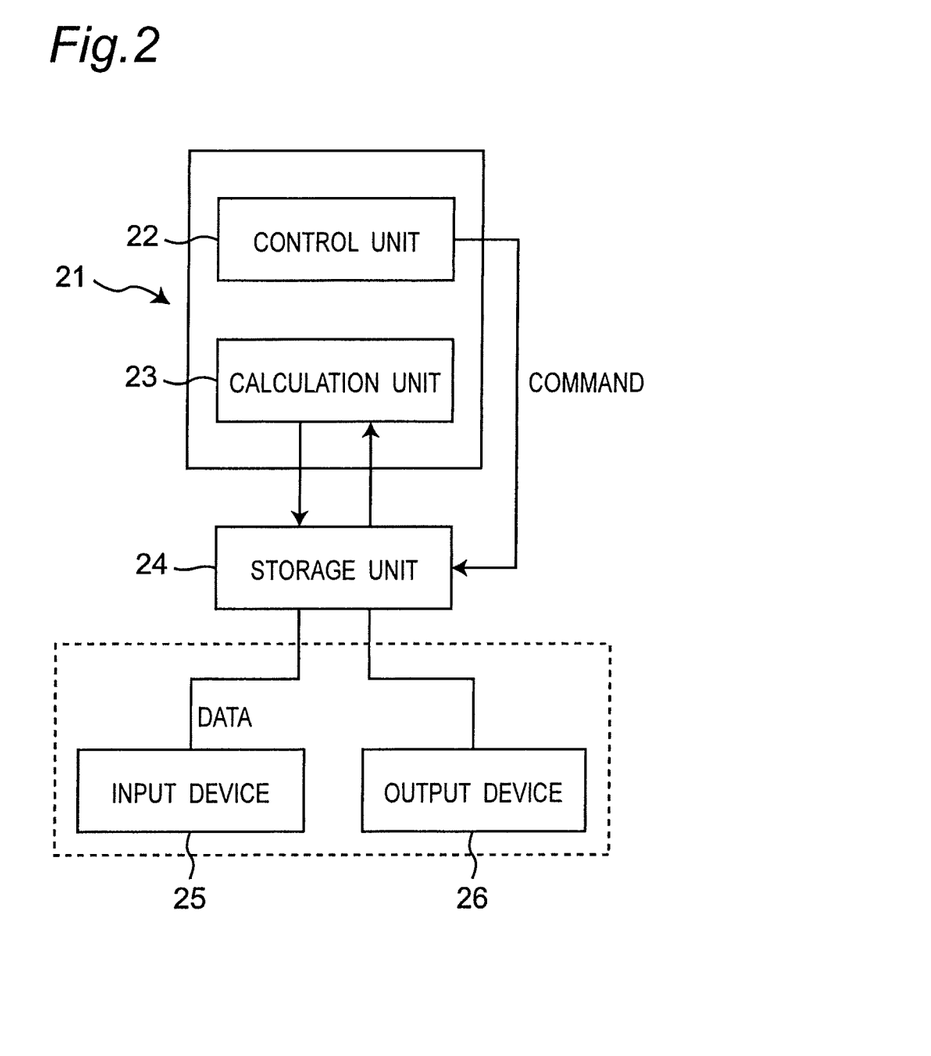
FIG. 2 is a block diagram showing a structural of a computer mounted on a total station depicted in FIG. 1.
Figure 3A:
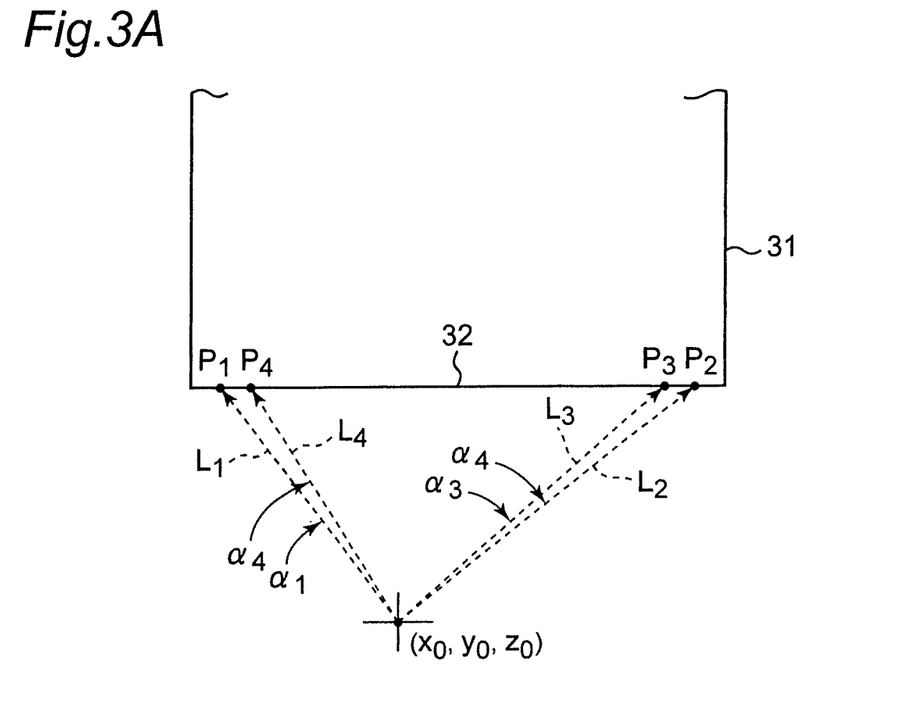
FIGS. 3A and 3B are diagrams showing the survey method according to the invention.
Figure 3B:
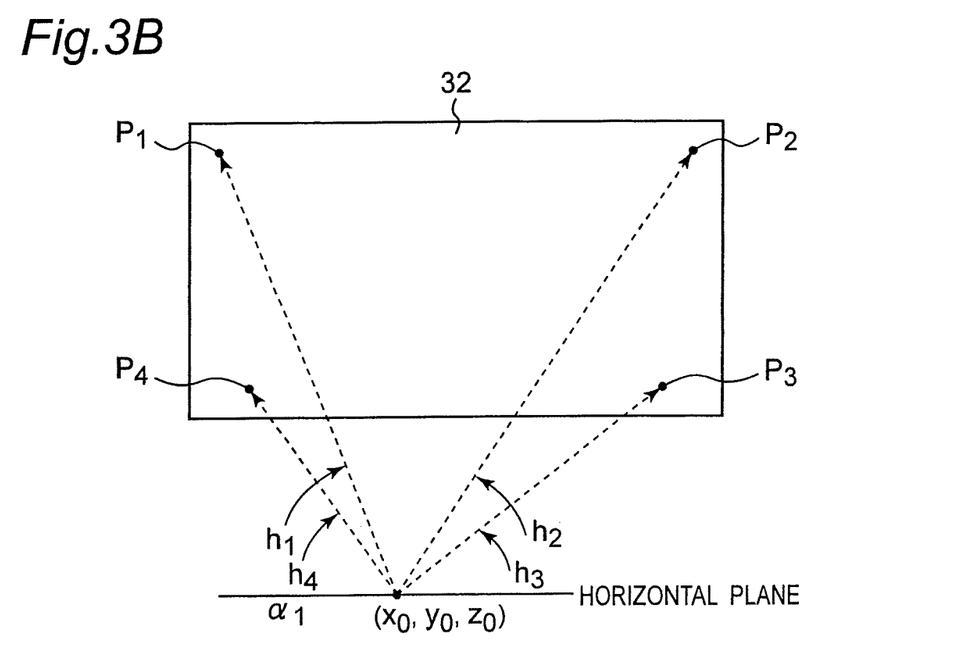

The total station 10 has a built-in computer. As shown in FIG. 2, a computer 20 includes a central processing unit 21 (including a control unit 22 and an calculation unit 23), a storage unit 24, and peripheral units. The peripheral units have input devices 25 such as ten keys and function keys and output devices 26 such as a display and an external output terminal. The storage unit 24 stores programs for data processing which will be described later, input data, and processed data obtained by processing various programs (including data in progress). The calculation unit 23 executes various calculations for processing input data according to the programs. The control unit 22 decodes instructions of the programs and outputs commands to the calculation unit 23, the storage unit 24, the input device 25, and the output device 26 according to the instructions.

In some embodiments, the calculation programs and the results obtained by the calculations are stored in the storage unit of the total station 10. An external computer (e.g., so-called personal computer or portable terminal) can be connected to an external connection terminal of the total station to store and display the calculation programs, the calculation results, and other data necessary for survey.

2. Surveys

Various surveys performed by using the total station 10 include a survey for specifying a flat surface (e.g., a wall surface of a building), a survey for specifying a corner (corner portion), and a survey for specifying an edge (edge portion) of the flat surface (hereinafter referred to as "surface survey", "corner survey", and "edge survey", respectively). Hereinafter, discussions will be made to the surface survey, corner survey, and edge survey.

2.1: Surface Survey

An example of the surface survey for specifying a structure's wall surface will be described. As shown in FIG. 1, it is assumed that apparently a building 31 to be surveyed has a flat wall surface 32. Inherently, even an apparently flat wall surface has at least some distortion and unevenness. For example, a concrete structure has some distortion transferred from that of formwork for the concrete structure. Tile joints may form concaves in the tile exterior. In this instance, an emitted laser beam from the total station can hit the concave or convex point in the wall surface. This results in that a surface specified by coordinate data of three points on the wall surface 32 may not be an accurate representative of the actual wall surface 32. To address this problem, the surface survey according to the invention incorporates an evaluation function for determining whether the surface specified by the surface survey accurately or substantially accurately represents the actual wall surface, which will be described together with the surface survey.

(1) Preparation

In the surface survey, the non-prism total station 10 is installed by an operator at a position from which the objective building 31 is visible. The operator then activates the total station 10 and obtains coordinates $(x_0, y_0, z_0')$ of an installation point where the total station 10 is installed. Also, using a vertical distance $(h_0)$ from a reference point of the total station to the installation point $(x_0, y_0, z_0')$, a coordinate $(x_0, y_0, z_0)$ (wherein $z_0 = z_0' + h_0$) of the reference point is calculated.

(2) Measurement (Step 1)

A region to be surface-surveyed (the entire wall surface or a portion of the wall surface) is determined on the wall of the structure 31, and then four measurement points $P_1$ (first point), $P_2$ (second point), $P_3$ (third point), and $P_4$ (fourth point) within the region are viewed or collimated by the telescope of the total station to obtain coordinates $(x_1, y_1, z_1)$, $(x_2, y_2, z_2)$, $(x_3, y_3, z_3)$, $(x_4, y_4, z_4)$ of the first to fourth points, respectively.

In this operation, the operator presses a surface survey key 15 of the input/output section 13, which energizes the control unit 22 to activate a surface survey program stored in the storage unit 24. The operator then collimates each measurement point with the telescope 14 and then presses a measurement key 16 of the input/output section 13. This results in that the control unit 22 automatically calculates the coordinate of the measurement point according to the surface survey program. The collimation and key operations are repeated for four measurement points to obtain the coordinates of the four measurement points. As is well known in the art, the coordinates $(x_1, y_1, z_1)$, $(x_2, y_2, z_2)$, $(x_3, y_3, z_3)$, and $(x_4, y_4, z_4)$ of the measurement points $P_1, P_2, P_3, P_4$ are each calculated using the coordinates $(x_0, y_0, z_0)$ of the reference point, oblique distances $(L_1, L_2, L_3, L_4)$ from the reference point to the measurement points, and direction angles $(\alpha_1, \alpha_2, \alpha_3, \alpha_4)$ and elevation angles $(h_1, h_2, h_3, h_4)$ of collimation axes oriented from the reference point toward the measurement points (see FIGS. 1, 2, and 3A-3B).

(3) Surface Equation (Step 2)

The control unit 22 retrieves the surface survey program and thereby processes the coordinates $(x_1, y_1, z_1)$, $(x_2, y_2, z_2)$, $(x_3, y_3, z_3)$, $(x_4, y_4, z_4)$ of the measurement points $P_1, P_2, P_3, P_4$ to obtain a surface equation [Eq. 1] of a first surface portion defined by connecting the points $P_1, P_2, P_3$, a surface equation [Eq. 2] of a second surface portion defined by connecting the points $P_2, P_3, P_4$, a surface equation [Eq. 3] of a third surface portion defined by connecting the points $P_3, P_4, P_1$, and a surface equation [Eq. 4] of a fourth surface portion defined by connecting the points $P_4, P_1, P_2$. Specifically, coefficients $(a_1, b_1, c_1, d_1, \ldots a_4, b_4, c_4, d_4)$ of the following surface equations are calculated.

[Eq. 1]
$$a_1 x + b_1 y + c_1 z + d_1 = 0 \tag{1}$$

[Eq. 2]
$$a_2 x + b_2 y + c_2 z + d_2 = 0 \tag{2}$$

[Eq. 3]
$$a_3 x + b_3 y + c_3 z + d_3 = 0 \tag{3}$$

[Eq. 4]
$$a_4 x + b_4 y + c_4 z + d_4 = 0 \tag{4}$$

(4) Perpendicular Distance (Step 3)

Figures 4A, 4B:
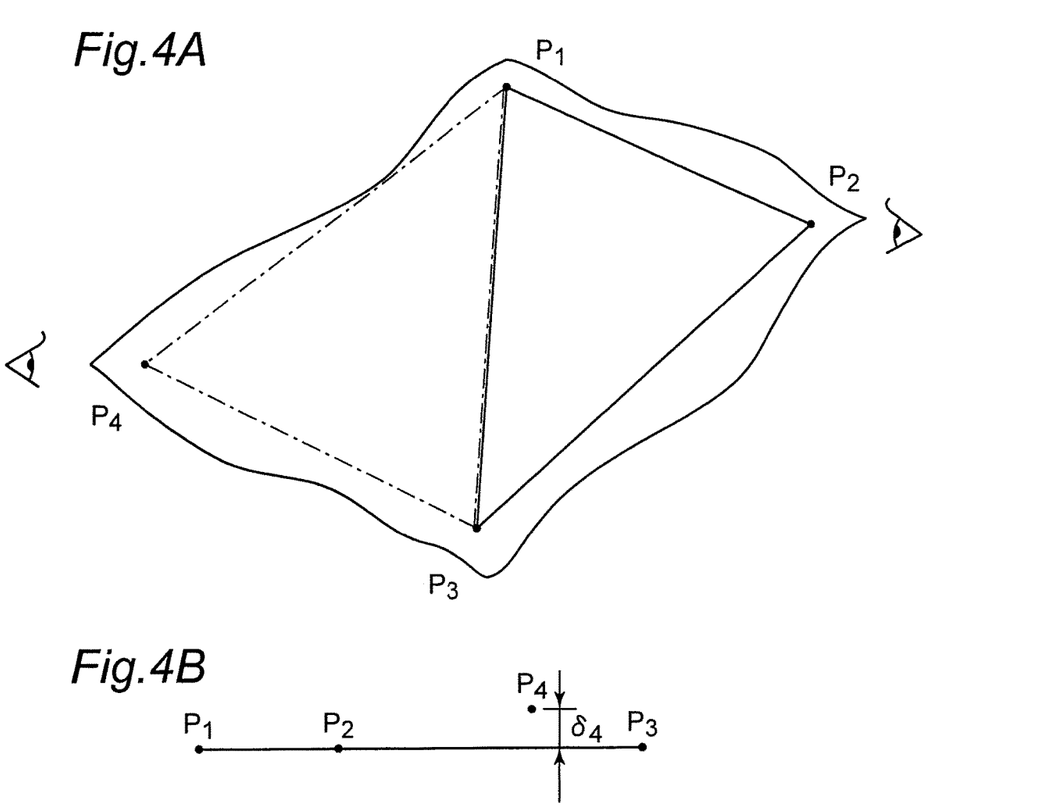
FIGS. 4A-4C are diagrams showing a distortion existing in a wall surface.
Figure 4C:
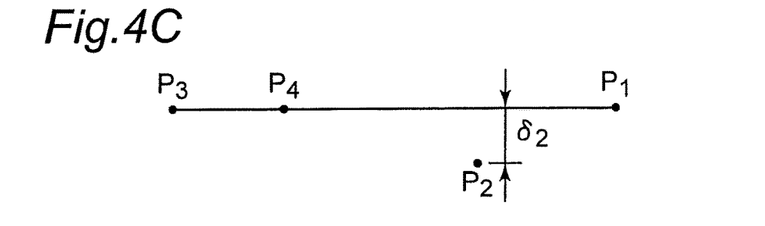

As described above, the four measurement points $P_1, P_2, P_3, P_4$ may not be located in one plane. For example, as shown in FIG. 4A, the point $P_4$ may not be in a plane of triangle $P_1 P_2 P_3$ defined by connecting three other points $P_1, P_2, P_3$ due to distortion, for example, of the wall surface (see FIG. 4B). Likewise, the point $P_2$ may not be in a triangle plane $P_3 P_4 P_1$ defined by connecting three other points $P_3, P_4, P_1$ (see FIG. 4C). A vertical distance from the point $P_4$ to the triangle plane $P_1 P_2 P_3$ is denoted by $\delta_4$ in FIG. 4B, and a vertical distance from the point $P_2$ to the triangle plane $P_3 P_4 P_1$ is denoted by $\delta_2$ in FIG. 4C.

The control unit 22 calculates according to the surface survey program the vertical distance $\delta_4$ from the point $P_4$ to the triangle plane $P_1 P_2 P_3$ [Eq. 5], the vertical distance $\delta_1$ from the point $P_1$ to the triangle plane $P_2 P_3 P_4$ [Eq. 6], the vertical distance $\delta_2$ from the point $P_2$ to the triangle plane $P_3 P_4 P_1$ [Eq. 7], and the vertical distance $\delta_3$ from the point $P_3$ to the triangle plane $P_4 P_1 P_2$ [Eq. 8].

[Eq. 5]
$$\delta_4 = \frac{|a_1 x_4 + b_1 y_4 + c_1 z_4 + d_4|}{\sqrt{a_1^2 + b_1^2 + c_1^2}} \tag{5}$$

[Eq. 6]
$$\delta_1 = \frac{|a_2 x_1 + b_2 y_1 + c_2 z_1 + d_2|}{\sqrt{a_2^2 + b_2^2 + c_2^2}} \tag{6}$$

[Eq. 7]
$$\delta_2 = \frac{|a_3 x_2 + b_3 y_2 + c_3 z_2 + d_3|}{\sqrt{a_3^2 + b_3^2 + c_3^2}} \tag{7}$$

[Eq. 8]
$$\delta_3 = \frac{|a_4 x_3 + b_4 y_3 + c_4 z_3 + d_4|}{\sqrt{a_4^2 + b_4^2 + c_4^2}} \tag{8}$$

(4) Maximum Perpendicular Distance (Step 4)

The control unit 22 compares the four vertical distances $\delta_1, \delta_2, \delta_3, \delta_4$ to determine the maximum vertical distance $\delta_{MAX}$ among them, according to the surface survey program. The maximum vertical distance $\delta_{MAX}$ is later used as an evaluation value.

(5) Evaluation (Step 5)

The control unit 22 retrieves a threshold value $\delta_{TH}$ stored in the storage unit 24 according to the surface survey program. The threshold value $\delta_{TH}$ is determined for the survey object, as necessary. The control unit 22 compares the threshold value $\delta_{TH}$ with the evaluation value $\delta_{MAX}$ and, if the evaluation value $\delta_{MAX}$ is not less than the threshold value $\delta_{TH}$, the control unit 22 displays a predetermined warning (e.g., "unmeasurable") on the display (e.g., liquid crystal display) 17 of the input/output section 13.

If the warning is displayed, the operator returns to step 1 and views and collimates new four measurement points $P_1$ (first point), $P_2$ (second point), $P_3$ (third point), and $P_4$ (fourth point) with the telescope 14 to obtain the coordinates $(x_1, y_1, z_1)$, $(x_2, y_2, z_2)$, $(x_3, y_3, z_3)$, $(x_4, y_4, z_4)$ of those four points. Subsequently, steps 2 to 5 are repeated.

(6) Specifying of Surface (Step 6)

If the evaluation value $\delta_{MAX}$ is less than the threshold value $\delta_{TH}$, the control unit 22 identifies any one of Eqs. (1) to (4) as the surface equation of the region according to the surface survey program.

2.2. Survey

The corner survey for obtaining coordinates of a corner will be described.

Figure 5A:
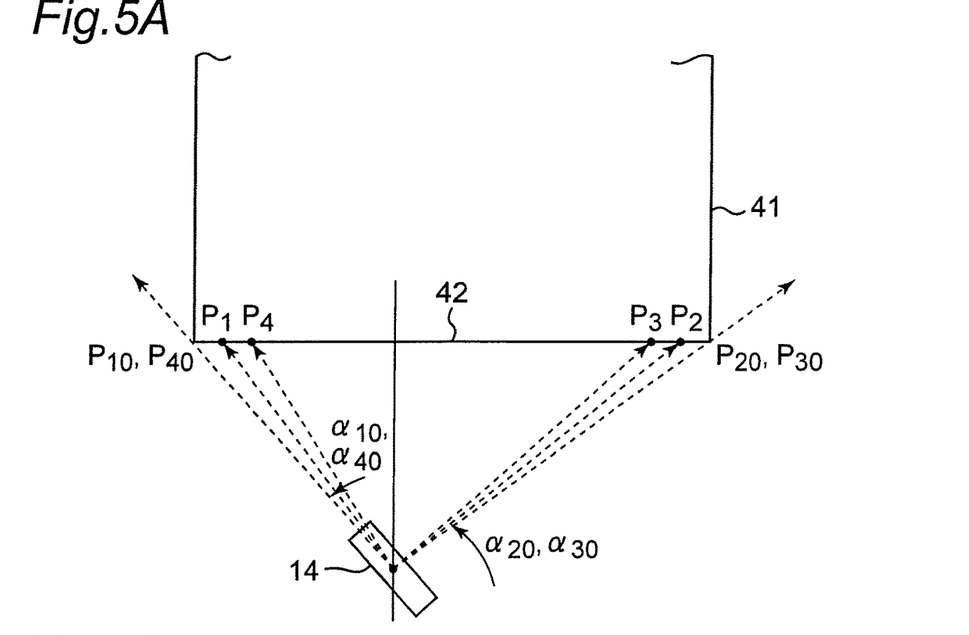
FIGS. 5A and 5B are diagrams showing the survey method (corner survey method and edge survey method) according to the invention.
Figure 5B:
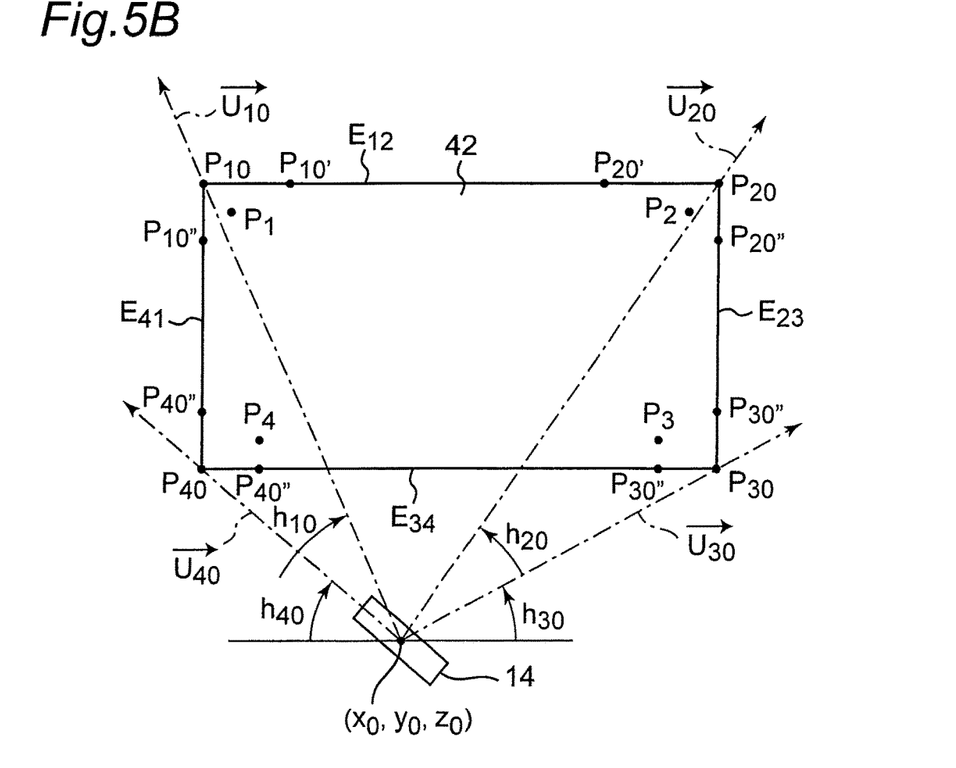

For example, as shown in FIGS. 5A and 5B, a wall surface 42 of a structure 41 is assumed, which is defined by left and right upper and lower corners $P_{10}$, $P_{20}$, $P_{30}$, $P_{40}$, upper and lower horizontal edges $E_{12}$, $E_{34}$, and left and right vertical edges $E_{41}$, $E_{23}$ connecting the corners.

(7) Surface Equations (Step 7)

The operator presses a corner survey key 18 of the input/output section 13. This allows that the control unit 22 drives a corner survey program stored in the storage unit 24 to execute steps 1 to 5 described above so as to obtain the coordinates $(x_1, y_1, z_1)$, $(x_2, y_2, z_2)$, $(x_3, y_3, x_3)$, $(x_4, y_4, z_4)$ of the four measurement points $P_1$, $P_2$, $P_3$, $P_4$ in the region within the wall surface 32 and also a surface equation specifying the wall surface 32. As shown in the drawings, the measurement points $P_1$, $P_2$, $P_3$, $P_4$ are preferably disposed in the vicinity of the four corners $P_{10}$, $P_{20}$, $P_{30}$, $P_{40}$. Alternatively, if the coordinate data of the surface survey using the measurement points $P_1$, $P_2$, $P_3$, $P_4$ is already stored in the storage unit 24, the coordinates and surface equations of the stored measurement points can be used for the corner survey instead.

(8) Direction Vector (Step 8)

The operator views and collimates the corners $P_{10}$, $P_{20}$, $P_{30}$, $P_{40}$ with the telescope 14. By the operator's pressing operations of the measurement key 16, the control unit 22 obtains direction vectors toward the collimated corner from the reference point [Eqs. (9), (10), (11), (12)] according to the corner survey program, based on direction angles $\alpha_{10}$, $\alpha_{20}$, $\alpha_{30}$, $\alpha_{40}$ and elevation angles $h_{10}$, $h_{20}$, $h_{30}$, $h_{40}$ of the collimation axis and the coordinates $(x_0, y_0, z_0)$ of the reference point. Specifically, the control unit 22 calculates values $a_{10}, b_{10}, c_{10}, \ldots a_{40}, b_{40}, c_{40}$ in Eqs. 9 to 12.

[Eq. 9]
$$\vec{u}_{10} = (a_{10}, b_{10}, c_{10}) \tag{9}$$

[Eq. 10]
$$\vec{u}_{20} = (a_{20}, b_{20}, c_{20}) \tag{10}$$

[Eq. 11]
$$\vec{u}_{30} = (a_{30}, b_{30}, c_{30}) \tag{11}$$

[Eq. 12]
$$\vec{u}_{40} = (a_{40}, b_{40}, c_{40}) \tag{12}$$

Based on the coordinates $(x_0, y_0, z_0)$ of the reference point and the direction vectors (Eqs. 9 to 12), equations [Eqs. (13), (14), (15), (16)] of straight lines connecting the reference point and the corners $P_{10}$, $P_{20}$, $P_{30}$, $P_{40}$, respectively, are obtained.

[Eq. 13]
$$\frac{x - x_0}{a_{10}} = \frac{y - y_0}{b_{10}} = \frac{z - z_0}{c_{10}} \tag{13}$$

[Eq. 14]
$$\frac{x - x_0}{a_{20}} = \frac{y - y_0}{b_{20}} = \frac{z - z_0}{c_{20}} \tag{14}$$

[Eq. 15]
$$\frac{x - x_0}{a_{30}} = \frac{y - y_0}{b_{30}} = \frac{z - z_0}{c_{30}} \tag{15}$$

[Eq. 16]
$$\frac{x - x_0}{a_{40}} = \frac{y - y_0}{b_{40}} = \frac{z - z_0}{c_{40}} \tag{16}$$

(9) Coordinates of Corners (Step 9)

According to the corner survey program, the control unit 22 uses the surface equation [e.g., any one of Eqs. (1), (2), (3), and (4)] obtained at step 7 and Eqs. 13 to 16 to determine the coordinates $(x_{10}, y_{10}, z_{10})$, $(x_{20}, y_{20}, z_{20})$, $(x_{30}, y_{30}, z_{30})$, $(x_{40}, y_{40}, z_{40})$ of the respective corners $P_{10}$, $P_{20}$, $P_{30}$, $P_{40}$, which are stored in the storage unit 24.

2.3. Edge Survey

Descriptions will be made of the edge survey specifying the upper edge connecting the corner $P_{10}$ and the corner $P_{20}$, the right edge connecting the corner $P_{20}$ and the corner $P_{20}$, the lower edge connecting the corner $P_{30}$ and the corner $P_{40}$, and the left edge connecting the corner $P_{40}$ and the corner $P_{10}$.

(10) Coordinates of Corners

The control unit 22 executes steps 1 to 5 described above according to an edge survey program to obtain the coordinates $(x_1, y_1, z_1)$, $(x_2, y_2, z_2)$, $(x_3, y_3, z_3)$, $(x_4, y_4, z_4)$ of the four measurement points $P_1$, $P_2$, $P_3$, $P_4$ in the region within the wall surface 32 and obtain a surface equation specifying the wall surface 32. As shown in the drawings, the measurement points $P_1$, $P_2$, $P_3$, $P_4$ are preferably disposed in the vicinity of respective four corners. Alternatively, if the coordinate data of the surface survey or the corner survey using the measurement points $P_1$, $P_2$, $P_3$, $P_4$ is already stored in the storage unit 24, the coordinates and surface equations of the stored measurement points can be used instead. The control unit 22 executes steps 6 to 9 described above according to the edge survey program to obtain the coordinates $(x_{10}, y_{10}, z_{10})$, $(x_{20}, y_{20}, z_{20})$, $(x_{30}, y_{30}, z_{30})$, $(x_{40}, y_{40}, z_{40})$ of the respective corners $P_{10}$, $P_{20}$, $P_{30}$, $P_{40}$ which are then stored in the storage unit 24.

(11) Equations of Edges

From the coordinates $(x_{10}, y_{10}, z_{10})$, $(x_{20}, y_{20}, z_{20})$, $(x_{30}, y_{30}, z_{30})$, $(x_{40}, y_{40}, z_{40})$ of the corners $P_{10}$, $P_{20}$, $P_{30}$, $P_{40}$, straight-line equations [Eq. (17)], [Eq. (18)], [Eq. (19)], and [Eq. (20)] are obtained for the upper edge $E_{12}$ connecting the corner $P_{10}$ and the corner $P_{20}$, the right edge $E_{23}$ connecting the corner $P_{20}$ and the corner $P_{30}$, the lower edge $E_{34}$ connecting the corner $P_{30}$ and the corner $P_{40}$, and the left edge $E_{41}$ connecting the corner $P_{40}$ and the corner $P_{10}$.

[Eq. 17]
$$\frac{x - x_{10}}{x_{20} - x_{10}} = \frac{y - y_{10}}{y_{20} - y_{10}} = \frac{z - z_{10}}{z_{20} - z_{10}} \tag{17}$$

-continued $$\frac{x - x_{20}}{x_{30} - x_{20}} = \frac{y - y_{20}}{y_{30} - y_{20}} = \frac{z - z_{20}}{z_{30} - z_{20}} \qquad (18)$$

[Eq. 19]

$$\frac{x - x_{30}}{x_{40} - x_{30}} = \frac{y - y_{30}}{y_{40} - y_{30}} = \frac{z - z_{30}}{z_{40} - z_{30}} \qquad (19)$$

[Eq. 20]

$$\frac{x - x_{40}}{x_{10} - x_{40}} = \frac{y - y_{40}}{y_{10} - y_{10}} = \frac{z - z_{40}}{z_{10} - z_{40}} \qquad (20)$$

Although, in the above description, the equations for the upper edge $E_{12}$, the right edge $E_{23}$, the lower edge $E_{34}$, and the left edge $E_{41}$ are obtained by using the coordinates of $P_{10}$, $P_{20}$, $P_{30}$, $P_{40}$ of the wall surface, the equations for the upper edge, the right edge, the lower edge, and the lower edge may be obtained by using edge points other than the corners (edge points $P_{10'}$, $P_{20'}$, $P_{30'}$, $P_{40'}$, $P_{10''}$, $P_{20''}$, $P_{30''}$, $P_{40''}$ shown in FIG. 5B). In this embodiment, the edge points correspond to the corners.

Figure 6:
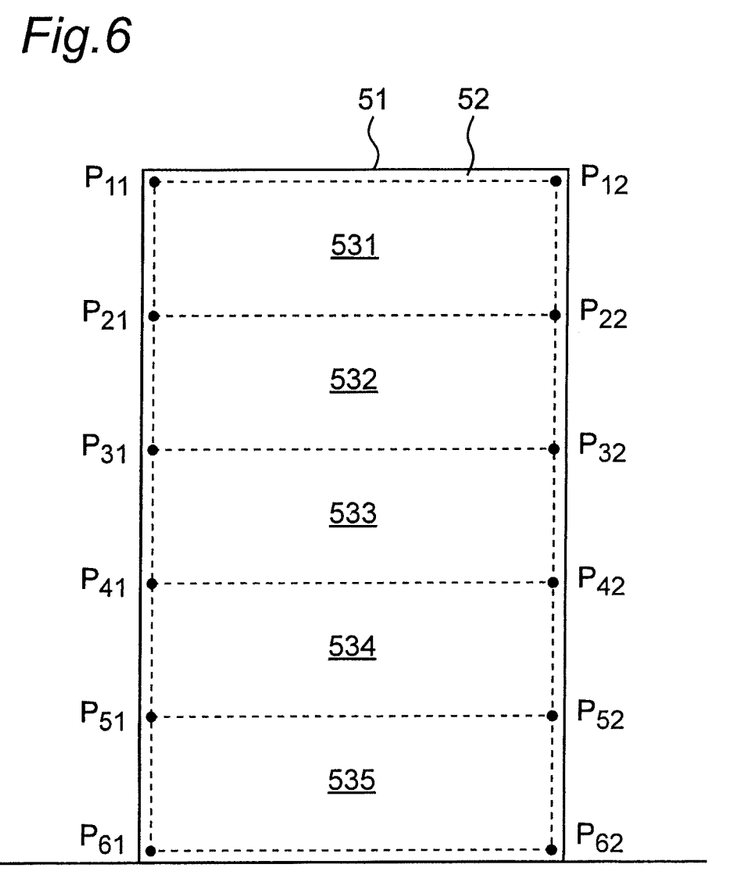
FIG. 6 is a diagram showing a survey method of a building wall surface.

By using the surface survey, corner survey, and edge survey described above, accurate data can be obtained for the entire wall surface 52 of the building 51 and corners and edges thereof shown in FIG. 6, for example. Specifically, if the building 51 shown in FIG. 6 is surveyed, multiple observation points $P_{11}$ to $P_{61}$, $P_{12}$ to $P_{62}$ are set on the objective wall surface 52, which is divided into multiple regions 531 to 535 by using these observation points, and the surface survey described above is performed to obtain the surface equation for each of the regions. The corner survey and the edge survey are performed to specify corners and edges if needed. Although the wall surface is divided into multiple rectangular regions in the above description, the shape and size of the regions may be determined depending on an object to be surveyed.

Embodiments of the invention further include
a survey method comprising
a first step of obtaining coordinates of first to fourth points on one wall surface,
a second step of specifying one surface including the first point, the second point, and the third point, following the first step,
a third step of obtaining a distance δ between the surface specified at the second step and the fourth point,
a fourth step of determining whether the distance δ is not less than a predetermined threshold value δth, and
a fifth step of returning to the first step if the distance δ is not less than the predetermined threshold value δth or defining the surface specified at the second step as a surface representative of the wall surface if the distance δ is less than the predetermined threshold value δth.

In this survey method, the fourth point may be inside or outside a triangular region defined by connecting the first to third points.

Although in this survey and the multiple survey methods described above, the coordinates of the points on the wall surface are preferably obtained by using a non-prism total station, the invention is not limited thereto.

3. Example

Figure 7:
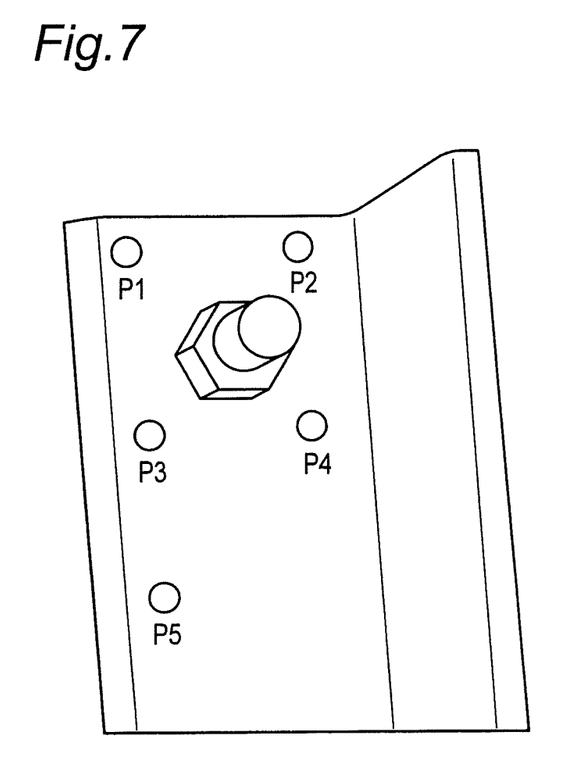
FIG. 7 is a diagram showing a part of a member (angle steel) of a steel tower and observation points set on the member.

By using a total station implementing the survey method of the invention, a plate width of a member (an angle steel shown in FIG. 7) constituting a portion of a steel tower was measured. Coordinates of five points ($P_1$, $P_2$, $P_3$, $P_4$, $P_5$) on a member surface of the object were obtained and the plate width was calculated by using these coordinates according to the method described above. The results are shown in FIG 8.

Figure 8:
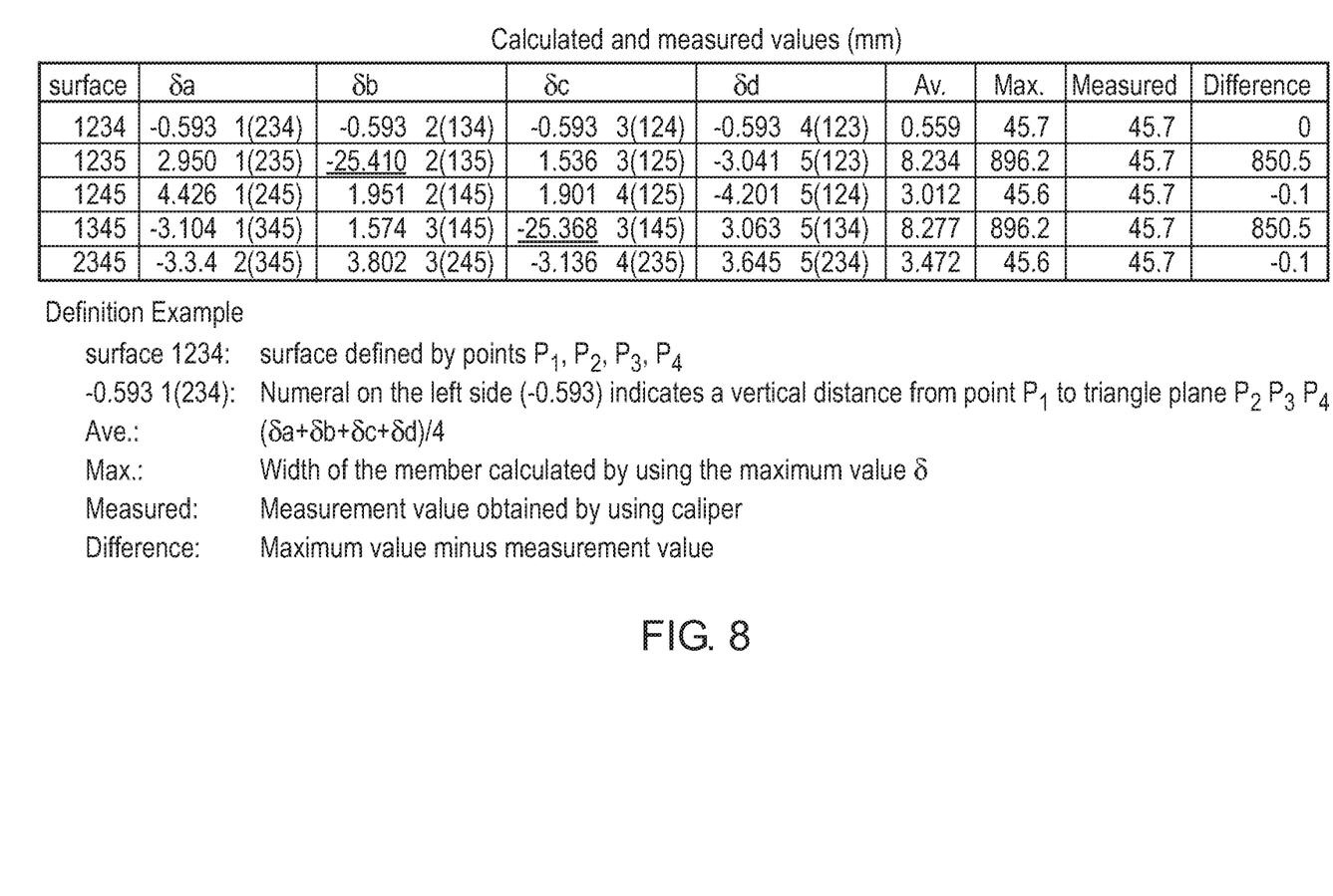
FIG. 8 is a table showing the results obtained according to an embodiment of the invention.

As shown in FIG. 8, in each of the survey results measured by using the surface 1235 and the surface 1345, a distance along one perpendicular line (δb=−25.410 mm, δc=−25.368 mm) was calculated significantly greater than those along other perpendicular lines. Additionally, the plate thickness (calculated value) calculated by using the largest δ value was considerably different from the measured value. However, it was confirmed that the other calculated values are almost equal to the measured values. Therefore, in this example, it is understood that the evaluation value may be set to ±5 mm, for example.

PARTS LIST 10 total station
11 lower structure (leveling plate)
12 upper structure
13 input/output section
14 telescope
15 surface survey key
16 measurement key
17 display part
18 angle survey key
20 computer
21 central processing unit
22 control unit
23 calculation unit
24 storage unit
25 input device
26 output device
31 building
32 wall surface

The invention claimed is:
1. A survey method comprising:
a first step in which coordinates of first to fourth points on one wall surface are obtained;
a second step in which, following the first step,
a first surface including the first, second, and third points, a second surface including the second, third, and fourth points, a third surface including the third, fourth, and first points, and a fourth surface including the fourth, first, and second points, are specified;
a third step in which, following the second step,
a fourth distance δ4 between the first surface and the fourth point, a first distance δ1 between the second surface and the first point, a second distance δ2 between the third surface and the second point, and a third distance δ3 between the fourth surface and the third point are obtained;
a fourth step in which, following the third step,
a largest value δmax of the first, second, third, and fourth distances δ1 to δ4 is determined as an evaluation value; and
a fifth step in which, following the fourth step, any of the first to fourth surfaces is defined as a specific surface specifying the wall surface in response to a determination the evaluation value δmax being less than a predetermined threshold value δth;
wherein the coordinates of the first to fourth points are obtained by using a non-prism total station.
2. The survey method according to claim 1, comprising a sixth step in which, following the fourth step, the first step is performed in response to a determination that the evaluation value δmax being not less than the predetermined threshold value δth.

3. A survey method comprising:
a first step in which coordinates of first to fourth points on one wall surface are obtained;
a second step in which, following the first step,
a first surface including the first, second, and third points, a second surface including the second, third, and fourth points, a third surface including the third, fourth, and first points, and a fourth surface including the fourth, first, and second points, are specified;
a third step in which, following the second step,
a fourth distance δ4 between the first surface and the fourth point, a first distance δ1 between the second surface and the first point, a second distance δ2 between the third surface and the second point, and a third distance δ3 between the fourth surface and the third point are obtained;
a fourth step in which, following the third step,
a largest value δmax of the first, second, third, and fourth distances δ1 to δ4 is determined as an evaluation value;
a fifth step in which, following the fourth step, any of the first to fourth surfaces is defined as a specific surface specifying the wall surface in response to a determination the evaluation value δmax being less than a predetermined threshold value δth; and
a sixth step in which, following the fourth step, the first step is performed in response to a determination that the evaluation value δmax being not less than the predetermined threshold value δth;
wherein the coordinates of the first to fourth points are obtained by using a non-prism total station.

4. The survey method according to claim 3, further comprising,
a step (a) in which a direction angle and an elevation angle of the corner with respect to the non-prism total station are obtained, and
a step (b) in which the coordinates of the corner from the direction angle, the elevation angle, and the specific surface is obtained;
wherein the steps (a) and (b) are performed if the wall surface has at least one corner.

5. The survey method according to claim 3, comprising,
a step (c) in which a direction angle and an elevation angle with respect to the non-prism total station for each of at least two first and second edge points included in the edge are obtained, and
a step (d) in which the coordinates of the first and second edge points from the direction angles and the elevation angles of the first and second edge points and the specific surface are obtained;
wherein the steps (c) and (d) are performed if the wall surface has at least one edge.

6. The survey method according to claim 1, further comprising,
a step (a) in which a direction angle and an elevation angle of the corner with respect to the non-prism total station are obtained, and
a step (b) in which the coordinates of the corner from the direction angle, the elevation angle, and the specific surface is obtained;
wherein the steps (a) and (b) are performed if the wall surface has at least one corner.

7. The survey method according to claim 1, comprising,
a step (c) in which a direction angle and an elevation angle with respect to the non-prism total station for each of at least two first and second edge points included in the edge are obtained, and
a step (d) in which the coordinates of the first and second edge points from the direction angles and the elevation angles of the first and second edge points and the specific surface are obtained;
wherein the steps (c) and (d) are performed if the wall surface has at least one edge.

\* \* \* \* \*